United States Patent
Baer et al.

(10) Patent No.: US 8,591,065 B2
(45) Date of Patent: Nov. 26, 2013

(54) PANEL ILLUMINATION SYSTEM

(76) Inventors: Josiah M. Baer, Kila, MT (US); Jay C. Rickel, Jr., Columbia Falls, MT (US)

(*) Notice: Subject to any disclaimer, the term of this patent is extended or adjusted under 35 U.S.C. 154(b) by 240 days.

(21) Appl. No.: 13/244,352

(22) Filed: Sep. 24, 2011

(65) Prior Publication Data

US 2013/0039034 A1 Feb. 14, 2013

Related U.S. Application Data

(60) Provisional application No. 61/521,322, filed on Aug. 8, 2011.

(51) Int. Cl.
*F21V 33/00* (2006.01)

(52) U.S. Cl.
USPC ............. 362/253; 362/20; 362/137; 362/183; 315/291; 307/126

(58) Field of Classification Search
USPC ...................... 362/137, 155, 253, 193, 95, 20; 315/291; 307/29, 126, 64; 340/638
See application file for complete search history.

(56) References Cited

U.S. PATENT DOCUMENTS

| | | | | |
|---|---|---|---|---|
| 4,518,957 A | * | 5/1985 | Wheeler | 340/639 |
| 4,611,201 A | * | 9/1986 | Guim et al. | 340/638 |
| 4,706,073 A | * | 11/1987 | Vila Masot | 340/639 |
| 4,945,345 A | | 7/1990 | Proctor et al. | |
| 6,045,232 A | * | 4/2000 | Buckmaster | 362/20 |
| 6,060,990 A | * | 5/2000 | Flegel | 340/584 |
| 6,615,522 B1 | | 9/2003 | Weis | |
| 7,616,096 B1 | * | 11/2009 | Sorensen | 340/286.13 |
| 7,843,358 B2 | | 11/2010 | Sebescak | |
| 7,888,821 B2 | | 2/2011 | Flegel et al. | |
| 2003/0075982 A1 | * | 4/2003 | Seefeldt | 307/29 |
| 2010/0327766 A1 | | 12/2010 | Recker et al. | |

* cited by examiner

*Primary Examiner* — Ali Alavi
(74) *Attorney, Agent, or Firm* — Law Office of Craig Bohn; Craig E. Bohn

(57) ABSTRACT

An illumination system integrateable into or retrofit onto a circuit panel breaker box. The system may include a light source, a power supply, and a switch to activate a light when the panel cover is removed, or when the line power to the breaker box is interrupted, or when the specific breaker for the light in the area of the panel is tripped. The system may include a light external to the breaker box to provide assistance in locating the box in a power-outage or tripped breaker situation, a light within the panel cover recess with a switch that activates the light when the panel cover door is opened to provide illumination for assessing the status of the breakers, and a light behind the panel cover with a switch that activates the light when the panel cover is removed to access the wiring and breakers within the box.

20 Claims, 3 Drawing Sheets

PANEL ILLUMINATION SYSTEM

CROSS-REFERENCE TO RELATED APPLICATIONS

This application claims the benefit of provisional patent application No. 61/521,322, filed 8 Aug. 2011 by the present inventors, J. Baer and J. Rickel.

STATEMENT REGARDING FEDERALLY SPONSORED RESEARCH OR DEVELOPMENT

Not Applicable

BACKGROUND OF THE INVENTION

Electrical panel boxes are widely used to safely collect and control various electrical systems within a structure, such as a house. Electricity is routed to the structure via a power line that in the United States typically consists of two 110 volt load wires, a neutral wire, and a ground wire. These wires are systematically separated into specialized electrical connections, referred to as busses, which permit multiple connections to the primary wires. The load wires, sometimes referred to as hot wires or leads, receive special treatment in order to provide safety from overloading a particular circuit, by routing the multiple incoming lines through individual circuit breakers that are specifically designed to connect to one of the two hot busses, also known as breaker busses.

Since the panel boxes are dangerous, and do not require regular access for daily operation of a structure, they are typically located in a remote location of the structure, which are frequently poorly lit. Additionally, during a power failure, or the occurrence of a tripped breaker, the panel box location may not have power for standard illumination. An individual intending to service the panel box will typically carry a flashlight to assist in locating the panel box, and inspecting the panel box once found, at a time with standard illumination is not available. Instances where that individual does not have a flashlight, or who needs both hands to safely address the particular situation, frequently occur.

The field of addressing power outages and electrical failures approach the problems from a variety of directions. These solutions typically address safety in the common areas, to provide backup illumination, or indicators at or near the panel box, to assist in identifying the cause of the outage. A number of examples follow.

U.S. Pat. No. 4,706,073 issued to Vila Masot on Nov. 10, 1987, discloses an alarm system used in conjunction with a circuit breaker panel box for indicating the presence of an overload condition, having at least one sensor in proximity with the circuit breaker box but is not physically connected thereto where this sensor senses various parameters which are inherent in an overload condition or which are produced by various circuitry connected to the circuit breaker which are enabled during an overload condition. This alarm system is set by closing the door of the circuit breaker panel box.

U.S. Pat. No. 4,945,345 issued to Ross Proctor and Emilio Ruiz on Jul. 31, 1990, discloses a circuit breaker signal for use with a circuit breaker having a switch lever assembly. An LED associated with each respective circuit breaker is mounted in a housing, and a switch extending from the housing comes in contact with the switch lever assembly when the circuit breaker has been activated, and in turn activates the associated LED.

U.S. Pat. No. 6,045,232 issued to Clifford Thoren Buckmaster on Apr. 4, 2000, discloses an apparatus designed for wall mounting in order to provide general emergency and night lighting upon detection of the failure of the line power source.

U.S. Pat. No. 6,615,522 issued to Donald J. Weis on Sep. 9, 2003, discloses an electrical panel cover and signage apparatus for protecting an electrical panel and indicating government installation codes.

U.S. Pat. No. 7,616,096 issued to Fred Sorensen on Nov. 10, 2009, discloses a movable reference guide mounted to slide over a circuit breaker reference chart on the door of a circuit breaker box to visually mark individual circuit breaker labels on the chart, and indicator lights associated with each of the circuit breakers on the breaker panel opposite the door, the indicator lights responsive to the position of the guide on the reference chart to light up when their corresponding labels are marked by the guide.

U.S. Pat. No. 7,843,358 issued to Andrew J. Sebescak on Nov. 30, 2010, discloses a power failure alarm for use in sounding a warning in the occasion of a power failure, with built in electrical connectors, and a temporary source of light. The device is housed in a molded plastic enclosure in a rectangular shape and includes an emergency light, nightlight, flashlight, and power failure alarm. All unit functions are completely automatic once the unit has been plugged into a standard voltage receptacle.

U.S. Pat. No. 7,888,821 issued to Michael O. and Jeffrey D. Flegel, and Neil A. Czarnecki on Feb. 15, 2011, discloses an electrical distribution system is designed to automatically connect a dedicated group of circuits, which are normally powered by a primary power source, to an auxiliary power source upon detection that there has been a disruption or failure in the primary power source.

U.S. Pat. Appl. Pub. No. 2010-0327766 filed by Michael V. Recker and David B. Levine, and published on Dec. 30, 2010, discloses systems and methods that provide for power outage lighting management within an environment comprising a power outage detection device adapted to detect a power outage condition and to wirelessly transmit power outage indication data to a plurality of lighting systems within the environment, where at least one of the plurality of lighting systems include an LED light source that is powered by an internal power source.

None of these systems include a light source with a battery power source that would be easily installable into the panel box, so that the light would always be available inside the panel cover and breaker box, even at a time of power interruption. It would be a useful addition to the field of art to have a system that includes a light, and a power supply, where the light is positionable internal to the panel box cover, with a switch that activates the light when the panel box cover door is opened to provide illumination for assessing the status of the breaker switches. It would additionally be useful to provide a light internal to the breaker box, behind the panel cover, with a switch that activates the light when the panel cover is removed, as by a technician to access the wiring and breakers within the breaker box.

BRIEF DESCRIPTION OF THE DRAWINGS

The invention will be explained in conjunction with an illustrative embodiment shown in the accompanying drawings, in which.

DESCRIPTION OF THE ILLUSTRATED EMBODIMENT

Figure 1:
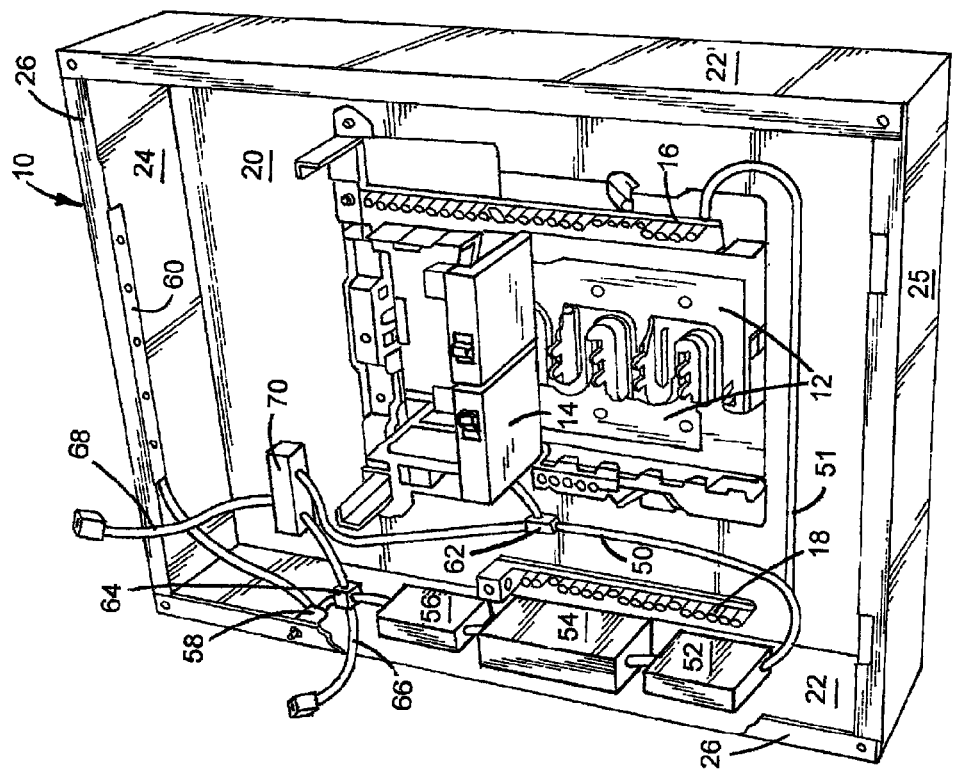
FIG. 1 is a perspective schematic illustration, with a partial cut-away, of the interior of an electrical panel breaker box, housing an exemplary embodiment of the current invention.

Now, referring to FIG. 1, the exemplary embodiment may be integrated into a standard breaker box 10, having breaker busses 12 for the load wires, otherwise referred to as the hot leads, slots to accommodate one or more breakers 14, a neutral bus 16, and a ground bus 18. These components are provided attached to the box back 20, and surrounded by box side walls 22 and 22', box top wall 24, and box bottom wall 25.

Figure 2:
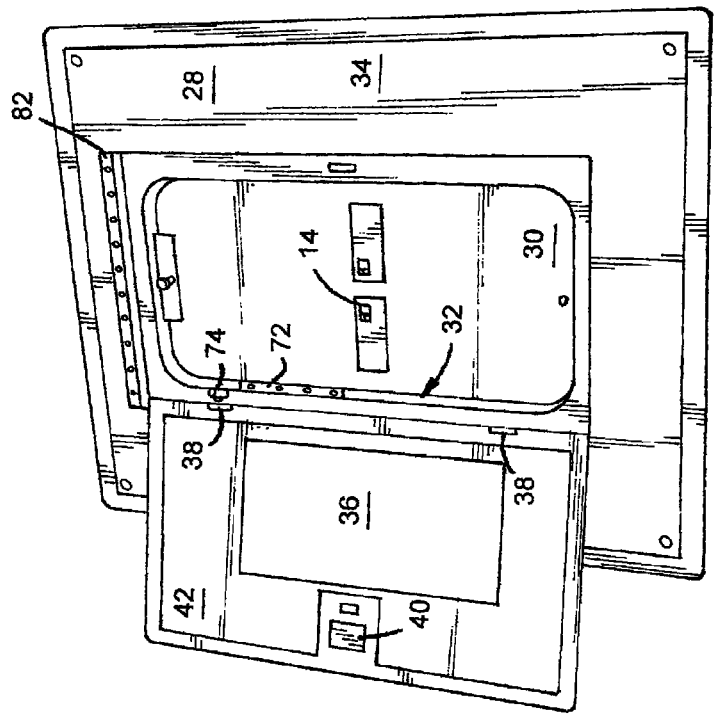
FIG. 2 is a perspective schematic illustration of an open panel cover for the embodiment in FIG. 1.
Figure 4:
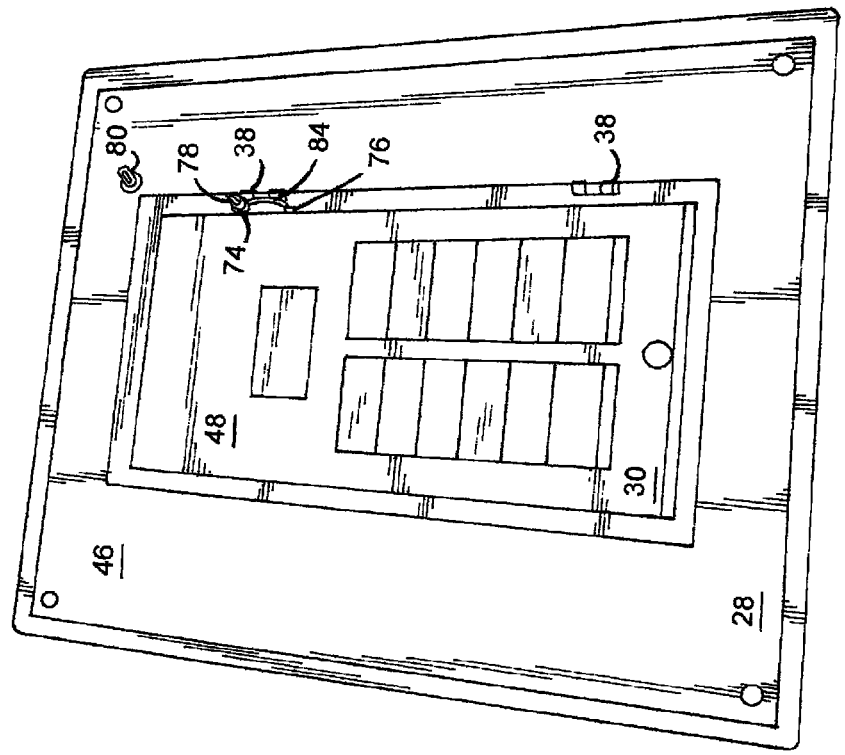
FIG. 4 is a perspective schematic illustration of the back of the panel cover of FIGS. 2 and 3.
Figure 3:
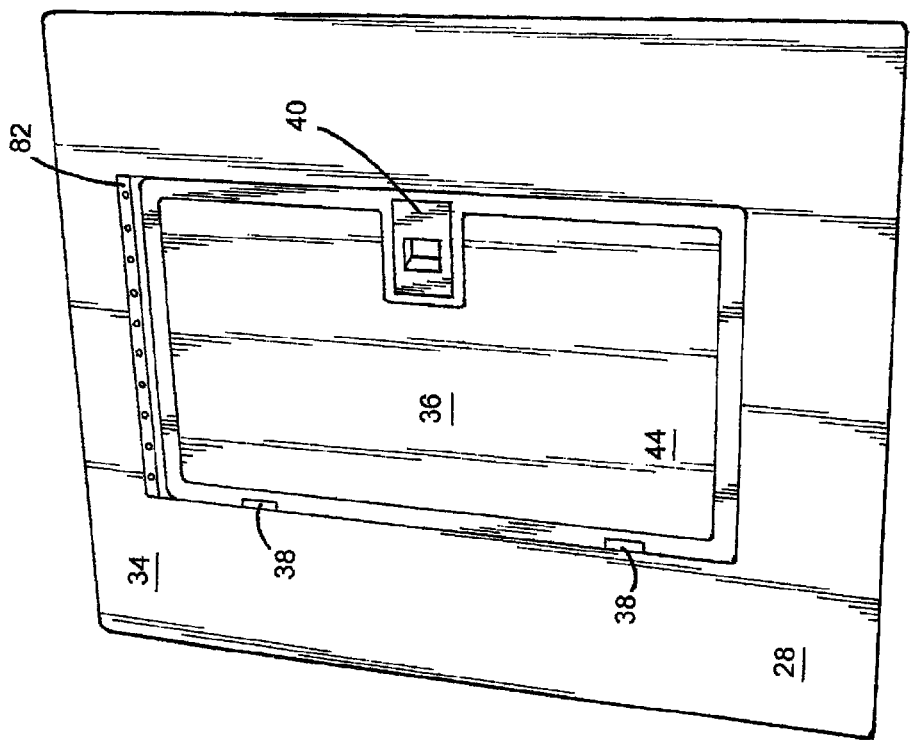
FIG. 3 is a perspective schematic illustration of the closed panel cover depicted in FIG. 2.

Referring now also to FIGS. 2, 3, and 4, a panel cover 28 provides enclosure for the box by being removably attached to the box front lip 26. A standard panel cover 28 includes a panel recess 30 that is indented back from the panel face 34 to form a surface through which the breakers may be accessed, but be protectable by the panel door 36. The indentation forms a recess side wall 32 around the periphery of the recess that is at an angle to the plane of the panel face 34. Panel door 36 may be opened and closed on panel door hinges 38, and the door secured in a closed position with panel door latch 40.

The exemplary embodiment is configured such that most of the components are housed within the breaker box 10, for enclosure behind the panel cover 28. A hot lead 50 may operatively connect the panel illumination system to a power supply at one of the breakers, in order to acquire a protected 110 volt power supply, and a neutral wire 51 may operatively connect the panel illumination system to a reliable system ground at a screw securement site on the neutral bus 16. In the exemplary embodiment it is the hot lead 50 and the neutral wire 51 that connect the power supply to an exemplary transformer 52, which converts the 110 volt load to a 12 volt supply, more suitable for low heat, low power usage lighting. The 12 volt supply is fed to an exemplary battery charger 54, which in turn provides suitable charging for exemplary battery 56. Battery 56 provides an interruptible power supply to the illumination source positioned within the breaker box 10, which in the exemplary embodiment is box light emitting diode ("LED") strip 60, but other suitable light sources may be employed. A panel cover switch 58 interrupts the power supply from the battery 56 to the box LED 60 when the switch is depressed by an appropriate panel cover 28 being installed, but permits the power supply from the battery 56 to illuminate the box LED 60 when the panel cover 28 is removed, whether or not there is currently power coming to the breaker bus 12. Exemplary box LED 60 is positioned on the box top wall 24 in order to provide illumination of the interior of breaker box 10, but other suitable locations may exist.

A battery power tap 64 may split a portion of the 12 volt supply from the battery 56 to the panel cover switch 58 via power panel recess LED lead 66. Panel recess LED lead 66 is removably connectable to a panel door switch 74 at panel door switch connector 78. Panel door switch 74 interrupts the power supply from the battery 56 to the panel recess LED 72 when panel door 36 is closed, which depresses panel door switch 74. When the panel door 36 is open, panel door switch 74 completes the connection, and power supply travels through panel door switch lead 84 to panel recess LED connector 76, which is operatively connected to panel recess LED 72 through panel face 34, causing panel recess LED 72 to illuminate. Exemplary panel recess LED 72 is positioned on the recess side wall 32 of panel recess 30 in order to provide illumination of the breakers 14, but other suitable locations may exist.

The exemplary embodiment may additionally have a power-loss indicator circuit 70, which receives a signal of whether current is live to the breaker bus 12 through hot tap lead 63, from hot tap 62, which is operatively connected to hot lead 50. In the exemplary embodiment hot tap 62 does not split the 110 volt current, but merely connects to it in order to permit power-loss indicator circuit 70 to sense the presence of the current. Power-loss indicator circuit 70 also obtains an uninterrupted low-voltage current from battery power tap 64. Upon sensing an interruption in the current to hot lead 50 from hot tap 62, power-loss indicator circuit 70 enables a low-voltage current to travel to panel face LED lead 68. Panel face LED lead 68 is operatively connectable to panel face LED connector 80, on panel cover back 46. Panel face LED connector 80 is operatively connected through panel cover 28, from the panel door back 42 to panel face LED 82 positioned on panel face 38. Exemplary panel face LED 82 is positioned on the panel face 34 in order to provide a signal to someone looking for the breaker box 10 in the dark, but other suitable locations may exist, including on panel door front 44. In that configuration panel face LED lead 68 could be configured to pass from the panel recess back 48, through panel recess 30, through panel door back 42 to an LED on the panel door front 44. Additionally, one may choose to connect other forms of alert mechanisms to the power-loss indicator circuit 70, in order to provide an alert of the power interruption to the breaker box 10 to a displaced location. Such suitable alternative forms of alert mechanisms may include, without limitation, an audible speaker, a radio transmitter, or a telephone dialer, to name a few suggestions.

Figure 5:
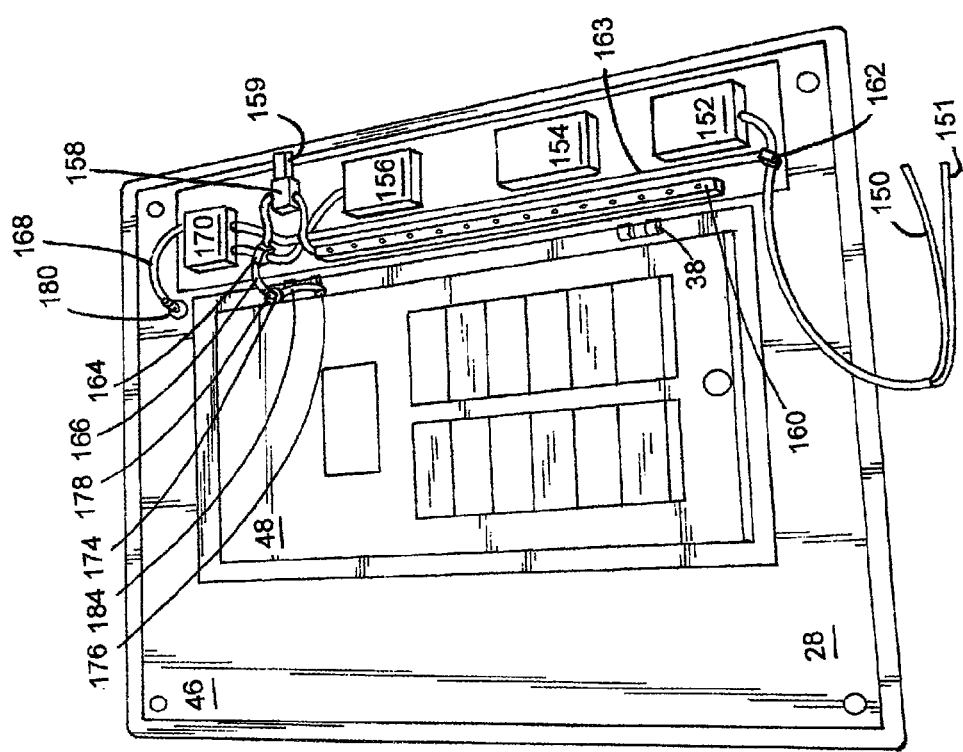
FIG. 5 is a perspective schematic illustration of an alternate exemplary embodiment of the current invention positionable on a panel cover.

Referring now to FIG. 5, an alternate exemplary embodiment provides that the components of the system are configured to attach to the panel cover 28; such that one may retrofit a currently installed breaker box 10 with the invention by replacing the standard panel cover 28 with one housing an embodiment of the current illumination system. The alternate exemplary embodiment uses similar reference numbers for similar respective components from the initial exemplary embodiment.

A hot lead 150 may operatively connect the alternate panel illumination system to a power supply at one of the breakers, in order to acquire a protected 110 volt power supply, and a neutral wire 151 may operatively connect the alternate panel illumination system to a reliable system ground at a screw securement site on the neutral bus 16. In the alternate exemplary embodiment it is the hot lead 150 and the neutral wire 151 that connect the power supply to an alternate exemplary transformer 152, which converts the 110 volt load to a 12 volt supply, more suitable for low heat, low power usage lighting. The 12 volt supply is fed to an alternate exemplary battery charger 154, which in turn provides suitable charging for alternate exemplary battery 156. In the alternate exemplary embodiment the transformer 152 and battery charger 154 are attached to the panel cover back 46.

Battery 156 provides an interruptible power supply to the illumination source positioned from the panel cover back 46, which in the alternate exemplary embodiment is cover light emitting diode ("LED") strip 160, but other suitable light sources may be employed. An alternate panel cover switch 158 interrupts the power supply from the battery 156 to the cover LED 160 when the pair of contacts 159 are held together by the pressure of being pressed between the cover 28 and the box front lip 26, as in when the panel cover 28 is appropriate attached to a breaker box 10, but permits the power supply from the battery 156 to illuminate the cover LED 160 when the panel cover 28 is removed, whether or not there is currently power coming to the breaker bus 12. Alternate exemplary cover LED 160 is positioned on the panel cover back 46 in order to provide illumination of the interior of breaker box 10 when the panel is removed, but other suitable locations may exist. In the exemplary embodiment, the cover LED 160 may be constructed so as to be detachable, and thereby positionable within breaker box 10. In light of this disclosure, one would appreciate that such alternative may include modifying the wiring arrangement shown in a suitable fashion, to include providing additional length of wire from switch 158 to cover LED 160.

An alternate battery power tap 164 may split a portion of the 12 volt supply from the battery 156 to the panel cover switch 158 via alternate power panel recess LED lead 166. Panel recess LED lead 166 is operatively connected to an alternate panel door switch 174 at alternate panel door switch connector 178. As in the initial embodiment, panel door switch 174 interrupts the power supply from the battery 156 to the panel recess LED 172 when panel door 36 is closed, which depresses panel door switch 74.

The exemplary embodiment may additionally have an alternate power-loss indicator circuit 170, which receives a signal of whether current is live to the breaker bus 12 through alternate hot tap lead 163, from alternate hot tap 162, which is operatively connected to hot lead 150. As in the initial embodiment hot tap 162 does not split the 110 volt current, but merely connects to it in order to permit power-loss indicator circuit 170 to sense the presence of the current. Power-loss indicator circuit 70 also obtains an uninterrupted low-voltage current from battery power tap 164. Upon sensing an interruption in the current to hot lead 150 from hot tap 162, power-loss indicator circuit 170 enables a low-voltage current to travel to panel face LED lead 168.

Figure 6:
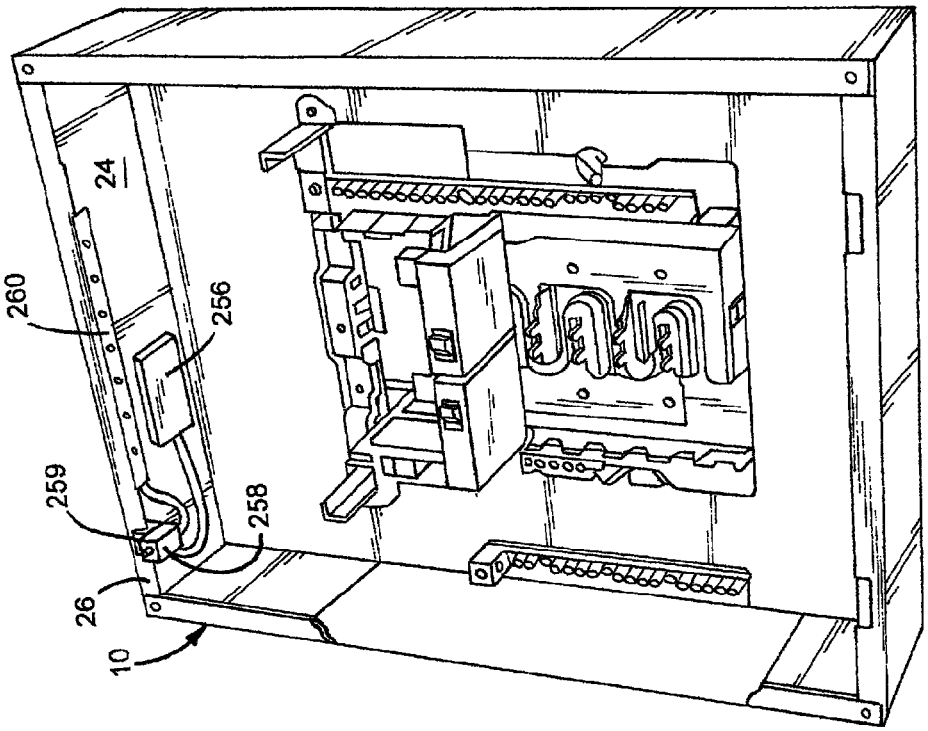
FIG. 6 is a perspective schematic illustration of a simplified alternate exemplary embodiment of the current invention.

Referring now to FIG. 6, an additional alternate exemplary embodiment may include alternate battery 256, an alternate panel cover switch 258, and an alternate box LED 260. Battery 256 provides an interruptible power supply to the illumination source positioned within the breaker box 10, which in the exemplary embodiment is alternate box light emitting diode ("LED") strip 260, but other suitable light or illumination sources may be employed. An alternate panel cover switch 258 interrupts the power supply from the battery 256 to the box LED 260 when the switch 258 is depressed by an appropriate panel cover 28 being installed, but permits the power supply from the battery 256 to illuminate the box LED 260 when the panel cover 28 is removed. By connecting the battery 256 switchably to the illumination source, box LED 260, the power reserve of the battery 256 is preserved for extended availability. Exemplary box LED 260 is positioned on the box top wall 24 in order to provide illumination of the interior of breaker box 10, but other suitable locations may exist.

In the alternate exemplary embodiment, the battery 256 and box LED 260 are removably attachable to the interior of the breaker box 10. Such removable attachment may be accomplished by a variety of suitable means, include double sided tape, hook and loop fastener strips, or adhesive, to name a few examples. Alternate exemplary switch 258 is selectively configurable, and may be configured to attach to the breaker box 10 in a variety of suitable manners to cause the switch 258 to interrupt the flow of current from the battery 256 to the box LED 260 when the panel cover 28 is installed on breaker box 10. The alternate exemplary switch 258 is attachable to the edge of box front lip 26 with a suitable means, such as a spring clip 259, so as to push against a panel cover 28 when it is properly installed on breaker box 10.

The battery 256 is installed in a charged state, ready to provide an extended period of use, and an even more greatly extended period of non-use. The battery 256 may be a rechargeable battery, or may be a disposable battery, and may be comprised of replaceable batteries of standard suitable size, such as a typical 9 volt, D cell, C, cell, AA cell, or AAA cell battery, to name a few examples.

The foregoing disclosure and description of the invention is illustrative and explanatory thereof. Various changes in the details of the illustrated construction may be made within the scope of the appended claims without departing from the spirit of the invention. The present invention should only be limited by the following claims and their legal equivalents.

We claim:

1. A device for illuminating an electrical panel, said panel having a breaker box, comprising:
    a battery, an illumination source, and a cover switch;
    the battery switchably connected to the illumination source via the cover switch; and
    the cover switch configureable to interrupt power between the battery and the illumination source when a panel cover is installed on the panel box.

2. The device of claim 1, wherein the battery and the illumination source are postionable within the breaker box.

3. The device of claim 1, wherein the battery and the illumination source are postionable on the panel cover.

4. The device of claim 1, wherein the electrical panel further comprises a protected power supply, further comprising:
    a battery charger operatively connectable to the protected power supply, and the battery charger operatively connectable to the battery in order to charge the battery.

5. The device of claim 4, wherein the battery charger is positionable on the panel cover.

6. The device of claim 4, wherein the battery charger is positionable within the breaker box.

7. A device for illuminating an electrical panel, said panel having a breaker box,
    wherein the electrical panel further comprises a protected power supply, comprising:
    a battery, a battery charger, an illumination source, and a cover switch;
    the battery charger operatively connectable to the protected power supply, and the battery charger operatively connectable to the battery in order to charge the battery;
    the battery switchably connected to the illumination source via the cover switch; and
    the cover switch configureable to interrupt power between the battery and the illumination source when a panel cover is installed on the panel box.

8. The device of claim 7, wherein the battery charger is attached to the panel cover.

9. The device of claim 8, wherein the battery charger is removably connectable to the battery.

10. The device of claim 7, wherein the electrical panel has a panel recess, further comprising:
    a panel recess LED removably connectable to the battery and positioned to illuminate the panel recess.

11. The device of claim 10, wherein the electrical panel has a panel door to the panel recess, further comprising:
    a panel door switch operatively connected to the panel recess LED to permit the illumination of the panel recess LED when the panel door is open.

12. The device of claim 7, further comprising:
a power-loss indicator circuit operatively connected to a power loss indicator to provide an alert upon an interruption in the power supply; and
the power-loss indicator circuit operatively connected to the protected power supply to detect an interruption in the power supply.

13. The device of claim 12, wherein the power loss indicator is a panel face LED.

14. The device of claim 12, wherein the power loss indicator is an audible sound generator.

15. The device of claim 12, wherein the power loss indicator is transmitter for transmitting a signal to a communication device.

16. A device for illuminating an electrical panel, said panel having a breaker box,
wherein the electrical panel further comprises a protected power supply, comprising:
a battery, a battery charger, an illumination source, and a cover switch;
the battery charger operatively connectable to the protected power supply, and the battery charger operatively connectable to the battery in order to charge the battery;
the battery switchably connected to the illumination source via the cover switch;
the cover switch configureable to interrupt power between the battery and the illumination source when a panel cover is installed on the panel box;
a power-loss indicator circuit operatively connected to a power loss indicator to provide an alert of an interruption in the power supply; and
the power-loss indicator circuit operatively connected to the protected power supply to detect an interruption in the power supply.

17. The device of claim 16 wherein the power loss indicator is a panel face LED.

18. The device of claim 16 wherein the power loss indicator is transmitter for transmitting a signal to a communication device.

19. The device of claim 16 wherein the electrical panel has a panel recess, further comprising:
a panel recess LED removably connectable to the battery and positioned to illuminate the panel recess.

20. The device of claim 19 wherein the electrical panel has a panel door to the panel recess, further comprising:
a panel door switch operatively connected to the panel recess LED to permit the illumination of the panel recess LED when the panel door is open.

* * * * *